US012057281B2

(12) United States Patent
Huang et al.

(10) Patent No.: US 12,057,281 B2
(45) Date of Patent: Aug. 6, 2024

(54) DIRECT CURRENT CONTACTOR AND VEHICLE

(71) Applicant: Huawei Digital Power Technologies Co., Ltd., Shenzhen (CN)

(72) Inventors: Guangming Huang, Dongguan (CN); Yang Zhu, Dongguan (CN); Taixian Chen, Dongguan (CN)

(73) Assignee: HUAWEI DIGITAL POWER TECHNOLOGIES CO., LTD., Guangdong (CN)

( * ) Notice: Subject to any disclaimer, the term of this patent is extended or adjusted under 35 U.S.C. 154(b) by 270 days.

(21) Appl. No.: 17/656,709

(22) Filed: Mar. 28, 2022

(65) Prior Publication Data

US 2022/0216023 A1    Jul. 7, 2022

Related U.S. Application Data

(63) Continuation of application No. PCT/CN2020/097551, filed on Jun. 22, 2020.

(30) Foreign Application Priority Data

Sep. 29, 2019 (CN) .......................... 201910936103.1

(51) Int. Cl.
*H01H 50/18* (2006.01)
*H01H 50/02* (2006.01)
(Continued)

(52) U.S. Cl.
CPC ............ *H01H 50/18* (2013.01); *H01H 50/02* (2013.01); *H01H 50/36* (2013.01); *H01H 50/44* (2013.01); *H01H 50/546* (2013.01)

(58) Field of Classification Search
CPC ........ H01H 50/18; H01H 50/02; H01H 50/36; H01H 50/44; H01H 50/546; H01H 50/045;
(Continued)

(56) References Cited

U.S. PATENT DOCUMENTS

| 4,131,865 A | 12/1978 | Hart |
| 4,338,583 A | 7/1982 | Mathieu |

(Continued)

FOREIGN PATENT DOCUMENTS

| CN | 2342458 Y | 10/1999 |
| CN | 2727944 Y | 9/2005 |

(Continued)

*Primary Examiner* — Shawki S Ismail
*Assistant Examiner* — Lisa N Homza
(74) *Attorney, Agent, or Firm* — WOMBLE BOND DICKINSON (US) LLP (57) ABSTRACT

This application provides a direct current contactor which includes a housing, and a first fixed contact and a second fixed contact that are fastened into the housing; a first moving contact and a second moving contact that are located in the housing; a drive mechanism, including: an insulation rod connected to the first moving contact and the second moving contact, and a drive component that drives the insulation rod to drive the first moving contact and the second moving contact to synchronously move toward the first fixed contact and the second fixed contact; and a pressing component configured to push the moving contact firmly against the fixed contact. Only two pairs of contacts are used to implement connection/disconnection of two electrode lines, so that a total contactor resistance is reduced by half compared with that in the conventional technology.

17 Claims, 5 Drawing Sheets

(51) Int. Cl.
 *H01H 50/36* (2006.01)
 *H01H 50/44* (2006.01)
 *H01H 50/54* (2006.01)

(58) Field of Classification Search
 CPC ........ H01H 9/443; H01H 50/20; H01H 50/26;
       H01H 50/38; H01H 50/641; H01H 50/54;
       H01H 50/14; H01H 50/16; H01H 50/24;
       H01H 50/64; Y02T 10/70; Y02T 10/7072;
                                    Y02T 90/14
 USPC .......................................................... 335/14
 See application file for complete search history.

(56) References Cited

U.S. PATENT DOCUMENTS

| | | | |
|---|---|---|---|
| 5,394,128 | A | 2/1995 | Perreira et al. |
| 6,246,306 | B1 | 6/2001 | Gruner |
| 2002/0135446 | A1 | 9/2002 | Takano et al. |
| 2007/0126538 | A1* | 6/2007 | Liu .................. H01H 50/32 335/172 |
| 2016/0133404 | A1* | 5/2016 | Zhong .............. H01H 50/546 335/201 |
| 2018/0040446 | A1* | 2/2018 | Vigouroux .......... H01H 50/36 |
| 2023/0098632 | A1* | 3/2023 | Gu .................... H01H 50/60 335/16 |
| 2023/0178320 | A1* | 6/2023 | Tian .................. H01H 50/18 335/2 |
| 2023/0223222 | A1* | 7/2023 | Tan ................... H01H 50/546 218/146 |

FOREIGN PATENT DOCUMENTS

| | | |
|---|---|---|
| CN | 2826553 Y | 10/2006 |
| CN | 102262981 A | 11/2011 |
| CN | 102522266 A | 6/2012 |
| CN | 104175991 A | 12/2014 |
| CN | 204155859 U | 2/2015 |
| CN | 204230168 U | 3/2015 |
| CN | 204632678 U | 9/2015 |
| CN | 104966646 A | 10/2015 |
| CN | 105551898 A | 5/2016 |
| CN | 107026056 A | 8/2017 |
| CN | 108010804 A | 5/2018 |
| CN | 208796916 U | 4/2019 |
| CN | 110783147 A | 2/2020 |
| DE | 2226196 B2 | 6/1975 |
| EP | 3345203 B1 | 8/2019 |
| GB | 2516096 B | 4/2021 |
| JP | 2009087918 A | 4/2009 |
| JP | 2012142195 A | 7/2012 |
| JP | 2016072021 A | 5/2016 |
| JP | 2017016907 A | 1/2017 |
| WO | 0186682 A2 | 11/2001 |
| WO | 2016029537 A1 | 3/2016 |

* cited by examiner

DIRECT CURRENT CONTACTOR AND VEHICLE

CROSS-REFERENCE TO RELATED APPLICATIONS

This application is a continuation of International Application No. PCT/CN2020/097551, filed on Jun. 22, 2020, which claims priority to Chinese Patent Application No. 201910936103.1, filed on Sep. 29, 2019. The disclosures of the aforementioned applications are hereby incorporated by reference in their entireties.

TECHNICAL FIELD

This application relates to the field of power technologies, and in particular, to a direct current contactor and a vehicle.

BACKGROUND

A high-voltage direct current contactor is an important power distribution control component of a direct current charging loop of a new energy vehicle. With improvement of an endurance capability requirement for a new energy vehicle, a capacity of a vehicle battery is also becoming larger. Therefore, voltage and current level requirements for an in-vehicle direct current contactor are becoming higher in the market (a current in-vehicle contactor has a maximum rated voltage of 800 Vd.c. to 1000 Vd.c. and a rated current of 200 A to 400 A). A volume and costs of a direct current contactor are determined by rated voltage and rated current levels of the contactor, and increases in a voltage and a current inevitably result in an increase in a volume and an increase in costs.

In a current direct current fast charging loop, regardless of a power side of a direct current fast charging apparatus or an in-vehicle power distribution unit (PDU), due to safety regulations (after a vehicle completes charging, an isolating distance is needed between a charging port/charging gun and a live power supply), one high-voltage direct current contactor is installed in each of positive electrode and negative electrode lines. This greatly increases total costs and a total volume of a charging loop apparatus. Because the two contactors of positive and negative electrodes of the direct current fast charging loop are simultaneously controlled to be open and closed, integrated design of the two contactors is an effective way to reduce total contactor costs and simplify a charging loop structure.

SUMMARY

This application provides a direct current contactor and a vehicle, to reduce a total contactor resistance and an on-state current loss of the direct current contactor, thereby simplifying a structure of the direct current contactor and reducing manufacturing costs of the direct current contactor.

According to a first aspect, a direct current contactor is provided. The direct current contactor is used in electrical connection. The direct current contactor includes a housing. The housing is used as a carrier. A first fixed contact and a second fixed contact are fastened into the housing, and the first fixed contact and the second fixed contact separately partially extend from the housing. Parts that are of the first fixed contact and the second fixed contact and that extend from the housing are used as connecting ends. In addition, the direct current contactor further includes a first moving contact and a second moving contact that are located in the housing, and the first moving contact and the second moving contact are respectively in a one-to-one correspondence with the first fixed contact and the second fixed contact. In addition, a first connecting bar and a second connecting bar are further disposed outside the housing, and the first connecting bar and the second connecting bar are respectively used as external connecting ends of the first moving contact and the second moving contact. During connection, the first connecting bar is electrically connected to the first moving contact by using a flexible cable, and the second connecting bar is electrically connected to the second moving contact by using a flexible cable. A path is formed when the first fixed contact is connected to the first moving contact, another path is formed when the second fixed contact is connected to the second moving contact, and the two paths may be used as a positive electrode connecting path and a negative electrode connecting path. During use, in the direct current contactor, disconnection and connection of the two paths are controlled by controlling movement of the first moving contact and the second moving contact. In an embodiment, the control is implemented by using a drive mechanism. The drive mechanism includes an insulation rod connected to the first moving contact and the second moving contact, so that the first moving contact and the second moving contact can synchronously move by using the insulation rod. In addition, the drive mechanism further includes a drive component that drives the insulation rod to drive the first moving contact and the second moving contact to synchronously move toward the first fixed contact and the second fixed contact, and a pressing component configured to push the first moving contact and the second moving contact to firmly against the first fixed contact and the second fixed contact in a one-to-one correspondence. It can be learned from the foregoing description that, in this application, only two pairs of contacts are used to implement connection/disconnection of two electrode lines, so that a total contactor resistance is reduced by half compared with that in the conventional technology, thereby resolving a problem of a large on-state current loss in the conventional technology. In addition, drive power consumption of a coil is reduced by half; and only a single drive mechanism is needed to drive two contacts, thereby greatly reducing difficulty in implementing closing and opening synchronicity between two electrode contacts.

In an embodiment, the first moving contact and the second moving contact can separately slide relative to the housing, and the drive component is configured to push the insulation rod to drive the first fixed contact and the second fixed contact to slide. Connection between the first moving contact and the first fixed contact and connection between the second moving contact and the second fixed contact are implemented through sliding of the first moving contact and the second moving contact.

In an embodiment, the insulation rod includes a support rod and a first connecting rod and a second connecting rod that are disposed on the support rod through fastening, and the first moving contact and the second moving contact are slidably assembled onto the first connecting rod and the second connecting rod in a one-to-one correspondence; and the pressing component includes: a first elastic member sleeved onto the first connecting rod, where two ends of the first elastic member are respectively pressed against the support rod and the first moving contact; and a second elastic member sleeved onto the second connecting rod, where two ends of the second elastic member are respectively pressed against the support rod and the second moving contact. A difference between the first moving contact and the second moving contact is reduced by using the first elastic member and the second elastic member, to ensure reliability of connection to the first fixed contact and the second fixed contact.

In an embodiment, a through hole that fits with the first connecting rod is disposed in the first moving contact, the first connecting rod is exposed after penetrating through the through hole, a locking nut is disposed on an exposed end part of the first connecting rod, and a groove for accommodating the locking nut is disposed on the first fixed contact; and a through hole that fits with the second connecting rod is disposed on the second fixed contact, the second connecting rod is exposed after penetrating through the through hole, a locking nut is disposed on an exposed end part of the second connecting rod, and a groove for accommodating the locking nut is disposed on the second moving contact, to prevent the locking nuts from being exposed, thereby ensuring reliability of connection between the first moving contact and the first fixed contact and reliability of connection between the second moving contact and the second fixed contact.

In an embodiment, the drive component includes a drive rod slidably connected to the housing, where the drive rod is connected to the support rod through fastening; and further includes a drive member configured to drive the drive rod to slide.

In an embodiment, the insulation rod includes a support rod, and the first moving contact and the second moving contact are separately connected to the support rod through fastening; the support rod is slidably connected to the drive component; and the pressing component includes a second elastic member, where one end of the second elastic member is abutted against the support rod, and the other end of the second elastic member is abutted against the drive component. The support rod is pushed, by using the second elastic member, to slide, to ensure reliability of connection between the moving contact and the fixed contact.

In an embodiment, the drive component includes a drive rod slidably connected to the housing, the drive rod is slidably connected to the support rod, the second elastic member is sleeved onto the drive rod, one end of the second elastic member is in pressure contact with the support rod, and the other end of the second elastic member is in pressure contact with the drive rod. The support rod is pushed, by using the second elastic member, to slide, to ensure reliability of connection between the moving contact and the fixed contact.

In an embodiment, the drive member includes: a first iron core and a second iron core that are oppositely disposed, where the first iron core is fastened onto the drive rod, the second iron core is fastened into the housing, and there is a gap between the first iron core and the second iron core; and
a magnetic coil that surrounds the first iron core and the second iron core, where when the magnetic coil is powered on, the second iron core and the first iron core attract each other; and
further includes a reset spring that is sleeved onto the drive rod and whose two ends are respectively pressed against the first iron core and the second iron core.

In an embodiment, the direct current contactor further includes a first magnet and a second magnet that are disposed on two opposite sides of an outer sidewall of the housing, where the first magnet is configured to extinguish an electric arc between the first fixed contact and the first moving contact, and the second magnet is configured to extinguish an electric arc between the second fixed contact and the second moving contact. There is no risk of short circuit caused because break arcs cross or are in contact with other electrodes. The contact structure can simplify an embodiment of a double-connection arc-extinguishing chamber, so that non-polar arc-extinguishing can be implemented without making a ceramic isolation wall between the two electrode contacts, and a quantity of arc-extinguishing permanent magnets can be reduced from 4 to 2.

In an embodiment, a first magnetic pole of the first magnet faces a gap between the first fixed contact and the first moving contact, a second magnetic pole of the second magnet faces a gap between the second fixed contact and the second moving contact, and polarity of the first magnetic pole is opposite to polarity of the second magnetic pole.

In an embodiment, the first moving contact includes a first body and a first elastic sheet connected to the first body, and the second moving contact includes a second body and a second elastic sheet connected to the second body;
the insulation rod is separately connected to the first elastic sheet and the second elastic sheet through fastening; and
the drive component is configured to drive the insulation rod to drive the first elastic sheet and the second elastic sheet to synchronously rotate toward the first fixed contact and the second fixed contact. Electrical connection between the fixed contacts and the moving contacts is implemented through rotating of the first elastic sheet and the second elastic sheet.

In an embodiment, the drive component includes a drive rod connected to the insulation rod through fastening, an armature connected to the drive rod, and an electromagnet that drives the armature to rotate.

In an embodiment, the armature is a V-shaped armature, the armature includes a first part and a second part connected to the first part, an angle between the first part and the second part is greater than 90 degrees, and the drive rod is connected to the first part through fastening;
the electromagnet includes an iron core and a coil wound around the iron core, and further includes a yoke fastened to the coil, where the yoke faces the insulation rod;
a connection position between the first part and the second part laps on an edge of the yoke, the first part is stacked with the yoke, and the second part faces the iron core; and
a reset spring is further included, where the reset spring is configured to push the first part against the yoke. Rotation of the first elastic sheet and the second elastic sheet is driven through rotation of the armature.

In an embodiment, the direct current contactor further includes a third magnet disposed outside the housing and a U-shaped magnetic conductive member connected to the third magnet, and two opposite sidewalls of the U-shaped magnetic conductive member are respectively configured to extinguish an electric arc between the first fixed contact and the first elastic sheet and an electric arc between the second fixed contact and the second elastic sheet. This improves an arc-extinguishing effect.

According to a second aspect, a vehicle is provided. The vehicle includes a body, a power distribution unit disposed on the body, and the direct current contactor according to any one of the first aspect and embodiments of the first aspect that is connected to the power distribution unit. In this application, only two pairs of contacts are used to implement connection/disconnection of two electrode lines, so that a total contactor resistance is reduced by half compared with that in the conventional technology, thereby resolving a problem of a large on-state current loss in the conventional technology. In addition, drive power consumption of the coil is reduced by half; and only a single drive mechanism is needed to drive two contacts, thereby greatly reducing difficulty in implementing closing and opening synchronicity between two electrode contacts.

DESCRIPTION OF EMBODIMENTS

Figure 1:
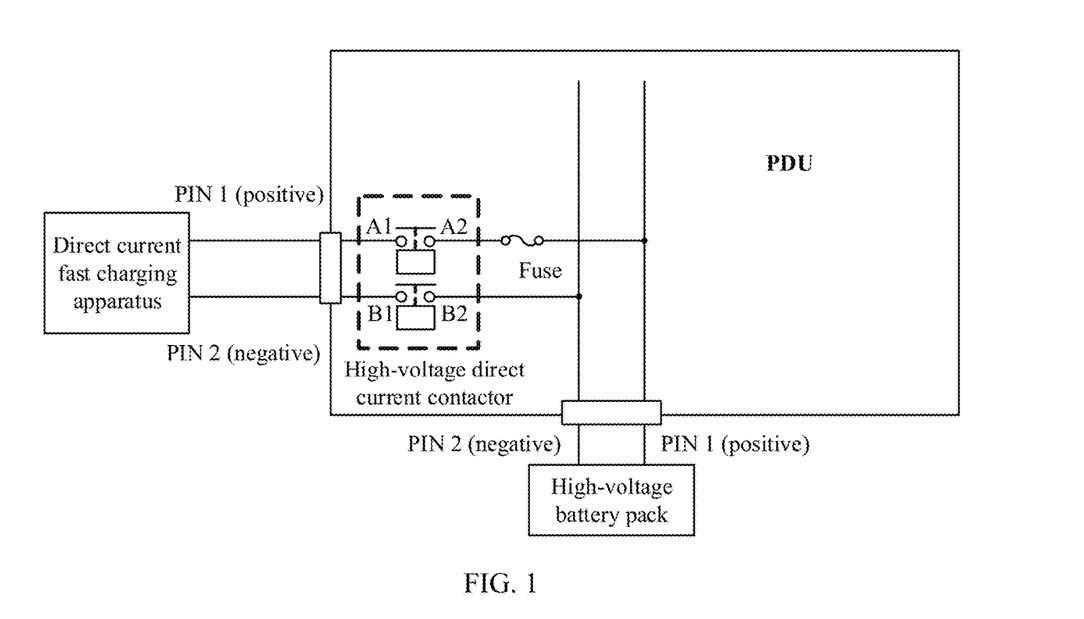
FIG. 1 is a reference diagram of a use status of a direct current contactor in the conventional technology.

To facilitate understanding of a direct current contactor provided in the embodiments of this application, first, an application scenario of the direct current contactor is described. The direct current contactor is applied to electrical connection, such as connection between an electric vehicle and a direct current fast charging apparatus, or connection between another electric cabinet and other electric equipment. The following uses an electric vehicle and a direct current fast charging apparatus as an example to describe application of the direct current contactor. FIG. 1 is a schematic diagram of fitting between an existing electric vehicle and a direct current fast charging apparatus. A PDU and a high-voltage battery pack connected to the PDU are disposed in the electric vehicle. A port of the electric vehicle has two wiring terminals: a PIN 1 and a PIN 2. The PIN 1 is a positive electrode terminal, and the PIN 2 is a negative electrode terminal. The PIN 1 terminal is connected to the PDU by using a direct current contactor, and then the PDU is connected to a positive electrode of the high-voltage battery pack. The PIN 2 terminal is connected to a negative electrode of the high-voltage battery pack by using a direct current contactor. During use, connection between the direct current fast charging apparatus and the high-voltage battery pack is controlled by controlling closing and opening of the direct current contactors. However, in the conventional technology, during direct current contactor disposition, a PIN 1 terminal and a PIN 2 terminal each need to be connected to one direct current contactor. As a result, an entire charging apparatus has a relatively large volume and occupies relatively large space. In addition, because two direct current contactors are used, it is difficult to completely synchronously open and close the two direct current contactors. Therefore, an embodiment of this application provides a direct current contactor. The following describes the direct current contactor in detail with reference to accompanying drawings and embodiments.

Figure 2:
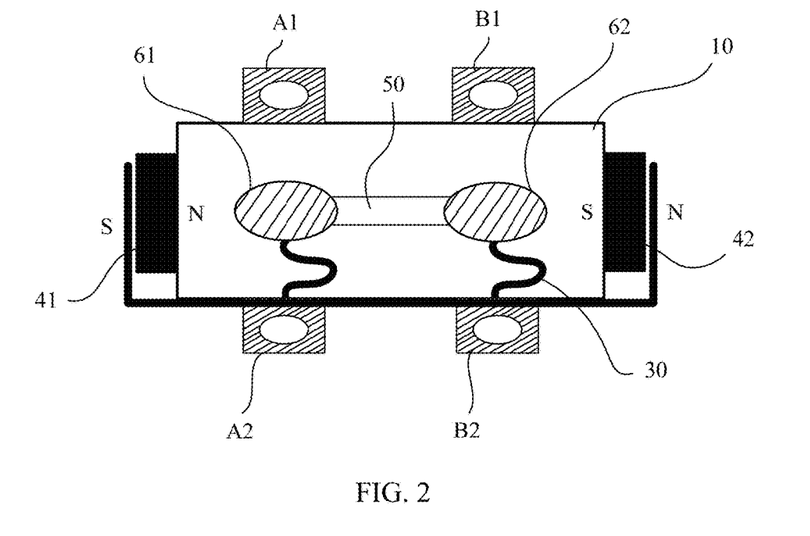
FIG. 2 is a schematic diagram of a first direct current contactor according to an embodiment of this application.
Figure 3:
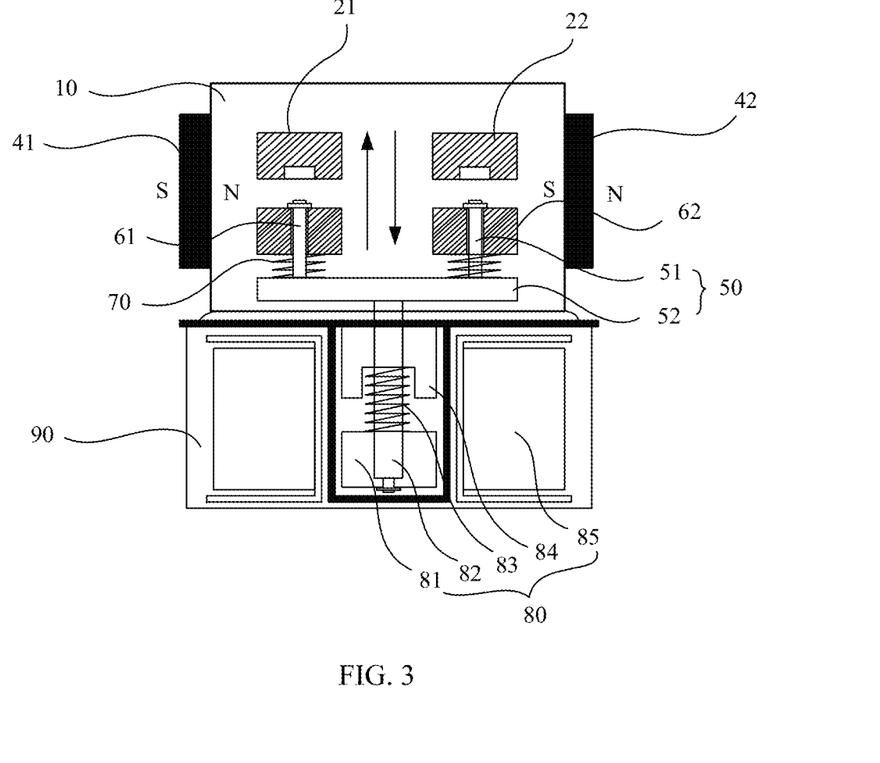
FIG. 3 is a schematic diagram of an internal structure of a first direct current contactor according to an embodiment of this application.

FIG. 2 is a schematic diagram of a structure of the direct current contactor, and FIG. 3 is a schematic diagram of an internal structure of the direct current contactor. First, referring to FIG. 2, the direct current contactor shown in FIG. 2 includes a housing and four connecting bars disposed on the housing. For ease of description, the four connecting bars are separately named a first connecting bar A2, a second connecting bar B2, a third connecting bar A1, and a fourth connecting bar B1. When the direct current contactor shown in FIG. 2 is applied to FIG. 1, the third connecting bar A1 is configured to be connected to the PIN 1 terminal in FIG. 1, the fourth connecting bar B1 is configured to be connected to the PIN 2 terminal in FIG. 1, the first connecting bar A2 is configured to be connected to the positive electrode of the high-voltage battery pack, and the second connecting bar B2 is configured to be connected to the negative electrode of the high-voltage battery pack. The first connecting bar A2 and the third connecting bar A1 are on a positive electrode line, and the second connecting bar B2 and the fourth connecting bar B1 are on a negative electrode line. Certainly, the foregoing is only an example. Alternatively, the first connecting bar A2 and the third connecting bar A1 may be on a negative electrode line, and the second connecting bar B2 and the fourth connecting bar B1 may be on a positive electrode line. In an embodiment of the application, the first connecting bar A2 and the third connecting bar A1 are merely limited to one line and are not specifically limited to a positive electrode line or a negative electrode line, and the second connecting bar B2 and the fourth connecting bar B1 are merely limited to one line and are not specifically limited to a positive electrode line or a negative electrode line.

Still referring to FIG. 2, when the first connecting bar A2, the second connecting bar B2, the third connecting bar A1, and the fourth connecting bar B1 are disposed, the first connecting bar A2 and the third connecting bar A1 are oppositely disposed on two opposite sides of the housing, and the second connecting bar B2 and the fourth connecting bar B1 are oppositely disposed on the two opposite sides of the housing. In addition, when the four connecting bars are disposed, the first connecting bar A2, the second connecting bar B2, the third connecting bar A1, and the fourth connecting bar B1 are separately insulated from the housing. Certainly, it should be understood that the arrangement manner shown in FIG. 2 is only an example in an embodiment of the application. In an embodiment of the application, positions of the first connecting bar A2, the second connecting bar B2, the third connecting bar A1, and the fourth connecting bar B1 relative to the housing are not limited. When the four connecting bars are disposed, the first connecting bar A2 and the second connecting bar B2 are located on a same side of the housing, and the third connecting bar A1 and the fourth connecting bar B1 are located on a same side of the housing, to facilitate connection between the connecting bars of the direct current contactor and cables.

FIG. 3 is a schematic diagram of an internal structure of the direct current contactor according to an embodiment of this application. It can be learned from FIG. 3 that the housing provided in an embodiment of the application is divided into two parts: a first housing and a second housing connected to the first housing through fastening. The first housing and the second housing share one sidewall. The first housing may be a ceramic housing, and the first housing has an arc-extinguishing chamber 10 inside and is sealed and filled with gas. The filled gas may be $H_2$, $N_2$, or $H_2/N_2$ mixed gas, and an arc-extinguishing capability can be improved by increasing air pressure. The second housing has a drive chamber 90 inside. Certainly, the housing provided in an embodiment of the application may be alternatively of an integral structure. In this case, the housing may be divided into the arc-extinguishing chamber 10 and the drive chamber 90 inside by using an isolating board or another structure. The following still uses an example in which the housing includes the first housing and the second housing, for description.

Referring to FIG. 2 and FIG. 3 together, when connected to the housing, the first connecting bar A2, the second connecting bar B2, the third connecting bar A1, and the fourth connecting bar B1 are connected to the first housing. In addition, four contacts are disposed in the first housing: a first fixed contact 21, a second fixed contact 22, a first moving contact 61, and a second moving contact 62. The first moving contact 61 is correspondingly connected to the first fixed contact 21, and the second moving contact 62 is correspondingly connected to the second fixed contact 22. The two moving contacts can move relative to the two fixed contacts, and opening and closing of the direct current contactor are controlled through connection and disconnection between the first fixed contact 21 and the first moving contact 61 and connection and disconnection between the second fixed contact 22 and the second moving contact 62.

Still referring to FIG. 2 and FIG. 3, the four contacts are connected to the four connecting bars in a one-to-one correspondence. In an embodiment, when the first fixed contact 21 and the second fixed contact 22 are separately connected to the first housing through fastening, the first fixed contact 21 and the second fixed contact 22 partially extend from the first housing. A part that is of the first fixed contact 21 and that extends from the first housing is the third connecting bar A1, and a part that is of the second fixed contact 22 and that extends from the first housing is the fourth connecting bar B1. When the first connecting bar A2 and the second connecting bar B2 are respectively connected to the first moving contact 61 and the second moving contact 62, because the first moving contact 61 and the second moving contact 62 can move relative to the first fixed contact 21 and the second fixed contact 22, and also move relative to the first connecting bar A2 and the second connecting bar B2, a structure shown in FIG. 2 and FIG. 3 is used during connection: The first connecting bar A2 is connected to the first moving contact 61 by using a flexible cable 30, and the second connecting bar B2 is connected to the second moving contact 62 by using a flexible cable 30. In this case, when the first moving contact 61 and the second moving contact 62 move relative to the first connecting bar A2 and the second connecting bar B2, both stability of connection between the first moving contact 61 and the first connecting bar A2 and stability of connection between the second moving contact 62 and the second connecting bar B2 can be ensured through deformation of the flexible cables 30.

It can be learned from the foregoing description that when the direct current connector is open, power outage between components connected to the direct current connector can be ensured, provided that the first moving contact 61 is separated from the first fixed contact 21 and the second moving contact 62 is separated from the second fixed contact 22. In addition, only two types of contact (contact between the first moving contact 61 and the first fixed contact 21 and contact between the second moving contact 62 and the second fixed contact 22) are used, so that a total contactor resistance of the direct current contactor is reduced by half compared with that in the conventional technology, thereby resolving a problem of a large on-state current loss.

Still referring to FIG. 3, when the first moving contact 61 and the second moving contact 62 move relative to the first fixed contact 21 and the second fixed contact 22, the first moving contact 21 and the second moving contact 22 can separately slide relative to the housing. As shown by arrows shown in FIG. 3, the first moving contact 61 and the second moving contact 62 can reciprocate in directions shown by the arrows shown in FIG. 3. A placement direction of the direct current contactor shown in FIG. 3 is used as a reference direction. When the first moving contact 61 and the second moving contact 62 move in a direction shown by a vertically upward arrow, the first moving contact 61 and the second moving contact 62 are respectively in pressure contact with the first fixed contact 21 and the second fixed contact 22. In this case, the direct current contactor is conducted. When the first moving contact 61 and the second moving contact 62 move in a direction shown by a vertically downward arrow, the first moving contact 61 and the second moving contact 62 are respectively detached from the first fixed contact 21 and the second fixed contact 22. In this case, the direct current contactor is open.

Still referring to FIG. 3, when the first moving contact 61 and the second moving contact 62 are driven, the driving is implemented by using a drive mechanism. The drive mechanism includes an insulation rod 50, a drive component 80, and a pressing component 70. The insulation rod 50 is separately connected to the first moving contact 61 and the second moving contact 62, and the first moving contact 61 and the second moving contact 62 are insulated from the insulation rod 50. For example, the insulation rod 50 is insulated from the first moving contact 61 and the second moving contact 62 by being made of an insulation material (such as plastic or resin), or in a manner in which an insulation pad is sleeved onto the insulation rod 50. Still referring to FIG. 3, the insulation rod 50 includes one support rod 52 and two connecting rods 51. The two connecting rods 51 and the support rod 52 may be of an integral structure. In this case, the support rod 52 and the two connecting rods 51 may be directly prepared in an integral injection molding manner, or may be prepared in a cutting manner. In addition, the two connecting rods 51 and the support rod 52 may be alternatively of a split structure. In this case, the two connecting rods 51 each may be connected to the support rod 52 through fastening by using a connecting member such as a bolt or a screw, or may be connected to the support rod 52 through fastening in a welding or bonding manner.

Still referring to FIG. 3, the two connecting rods 51 are respectively configured to fasten the first moving contact 61 and the second moving contact 62 in a one-to-one correspondence. For ease of description, the two connecting rods 51 are separately named a first connecting rod 51 and a second connecting rod 51. A manner in which the first connecting rod 51 is connected to the first moving contact 61 is the same as a manner in which the second connecting rod 51 is connected to the second moving contact 62. Therefore, the following describes a manner in which the first moving contact 61 fits with the first connecting rod 51.

Still referring to FIG. 3, the first moving contact 61 is slidably assembled onto the first connecting rod 51, and can slide in a vertical direction relative to the first connecting rod 51. A through hole that allows to be penetrated through is disposed in the first moving contact 61. During assembling, the first connecting rod 51 is inserted into a first through hole and exposed, and a locking nut is disposed on an exposed end part of the first connecting rod 51. The locking nut is connected to the first connecting rod 51 by using screw threads, and the locking nut is abutted against an end face that is of the first moving contact 61 and that faces away from the support rod 52, or the first moving contact may be locked in another limiting manner, for example, by using a buckle. The locking nut is used as a limiting member, to limit a sliding distance of the first moving contact 61 on the first connecting rod 51. Still referring to FIG. 3, it can be learned from FIG. 3 that, the face that is of the first moving contact 61 and that faces away from the support rod 52 is an end face that is of the first moving contact 61 and that fits with the first fixed contact 21. To prevent the disposed locking nut from affecting an effect of contact between the first moving contact 61 and the first fixed contact 21, a groove for accommodating the locking nut is disposed on the first fixed contact 61. In an assembling effect shown in FIG. 3, both the end part of the first connecting rod 51 and the locking nut are located in the groove, and both end surfaces of the first connecting rod 51 and the locking nut are located in the groove, to prevent the first connecting rod 51 and the locking nut from protruding from the first fixed contact 61.

Still referring to FIG. 3, a first elastic member is further sleeved onto the first connecting rod 51, and two ends of the first elastic member are respectively pressed against the first moving contact 61 and the support rod 52. When being elastically deformed, the first elastic member pushes the first moving contact 61 firmly against the first fixed contact 21. When the first moving contact 61 moves along the vertically upward arrow shown in FIG. 3, when the first moving contact 61 is in contact with the first fixed contact 21, the first moving contact 61 slides relative to the support rod 52; and simultaneously the first elastic member is compressed to be elastically deformed, and the deformed first elastic member pushes the first moving contact 61 firmly against the first fixed contact 21. The first elastic member may be an elastic member that can push the first moving contact 61 firmly against the first fixed contact 21 when being deformed, such as a compression spring or a rubber spring.

The second connecting rod 51 is connected to the second moving contact 62 in a manner similar to the foregoing manner. As shown in FIG. 3, the second connecting rod 51 is exposed after penetrating through a through hole in the second moving contact 62, a locking nut is disposed on an exposed end part of the second connecting rod 51, and a groove for accommodating the locking nut is disposed on the second fixed contact 62. A second elastic member is sleeved onto the second connecting rod 51, and two ends of the second elastic member are respectively pressed against the second moving contact 62 and the support rod 52. For a structure of the second connecting rod 51 and the second moving contact 62, refer to the descriptions of the first connecting rod 51 and the first moving contact 61. Details are not described herein.

Still referring to FIG. 3, in the drive mechanism provided in an embodiment of the application, the disposed insulation rod 50 is separately connected to the first moving contact 61 and the second moving contact 62, so that when the drive mechanism drives the first moving contact 61 and the second moving contact 62 to move, synchronous movement of the first moving contact 61 and the second moving contact 62 can be ensured by using the insulation rod 50. In addition, as the foregoing pressing component 70, the first elastic member and the second elastic member can respectively push the first moving contact 61 firmly against the first fixed contact 21 and push the second moving contact 62 firmly against the second fixed contact 22, so that a difference between the first moving contact 61 and the second moving contact 62 during synchronous movement can be avoided. If an assembling error exists between the first fixed contact 21 and the second fixed contact 22, or an assembling error exists between the first moving contact 61 and the second moving contact 62, the error between the two contacts can be eliminated by using the disposed first elastic member and second elastic member to push the first moving contact 61 and the second moving contact 62 to slide, to ensure that the first moving contact 61 and the second moving contact 62 can be respectively reliably connected to the first fixed contact 21 and the second fixed contact 22.

Still referring to FIG. 3, the drive mechanism provided in an embodiment of the application further includes the drive component 80. The drive component 80 is configured to drive the insulation rod 50 to drive the first moving contact 61 and the second moving contact 62 to synchronously move toward the first fixed contact 21 and the second fixed contact 22. As shown in FIG. 3, the drive component 80 includes a drive rod 82 slidably connected to the housing, and the drive rod 82 is connected to the support rod 52 through fastening. As shown in FIG. 3, the drive rod 82 is disposed in the second housing and extends into the first housing by penetrating through the sidewall between the second housing and the first housing, and an end that is of the drive rod 82 and that extends into the first housing is connected to the support rod 52 through fastening. As shown in FIG. 3, the support rod 52 and the drive rod 82 form a T-shaped structure. When the support rod 52 is connected to the drive rod 82, the drive rod 82 and the support rod 52 may be of an integral structure, or the drive rod 82 and the support rod 52 may be of a split structure. When the drive rod 82 and the support rod 52 are of a split structure, the drive rod 82 and the support rod 52 are connected in a bonding manner, a welding manner, or the like, or may be connected through fastening by using a screw thread connecting member.

Figure 4:
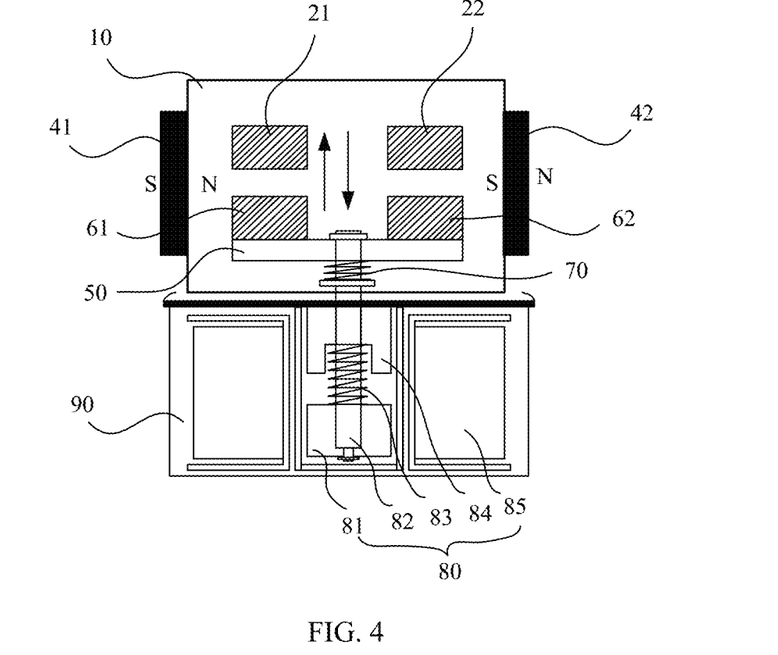
FIG. 4 is a schematic diagram of an internal structure of a second direct current contactor according to an embodiment of this application.

Still referring to FIG. 3, the drive component 80 further includes a drive member. The drive member is configured to drive the drive rod 82 to slide. As shown in FIG. 3, the drive member includes two oppositely disposed iron cores. For ease of description, the two iron cores are separately named a first iron core 81 and a second iron core 84. The first iron core 81 is fastened onto the drive rod 82, the second iron core 84 is fastened into the housing, and there is a gap between the first iron core 81 and the second iron core 84. As shown in FIG. 3, the first iron core 81 is fastened to an end that is of the drive rod 82 and that is far away from the first housing, and the second iron core 84 is fastened to an end that is in the second housing and that is close to the first housing. In addition, a through hole that allows to be penetrated through by the drive rod 82 is disposed in the second iron core 84, and during assembling, the drive rod 82 is inserted into the first housing after penetrating through the through hole of the second iron core 84. As shown in FIG. 4, there is the gap between the first iron core 81 and the second iron core 84, and a reset spring 83 is disposed at the gap. The reset spring 83 is sleeved onto the drive rod 82, and two ends of the reset spring 83 are respectively pressed against the first iron core 81 and the second iron core 84. Still referring to FIG. 4, the drive member further includes a magnetic coil that surrounds the first iron core 81 and the second iron core 84. In addition, when the magnetic coil is powered on, the second iron core 84 and the first iron core 81 attract each other. During use of the direct current contactor, when the magnetic coil is powered on, the second iron core 84 and the first iron core 81 attract each other. Because the second iron core 84 is fastened into the second housing, the first iron core 81 overcomes an elastic force of the reset spring 83 to slide toward the magnetic coil and simultaneously push the drive rod 82 to slide, and the drive rod 82 drives the insulation rod 50 to push the first moving contact 61 and the second moving contact 62 to move in the direction shown by the vertically upward arrow in FIG. 4. When the first iron core 81 is in contact with the second iron core 84, the first moving contact 61 and the second moving contact 62 are respectively pressed against the first fixed contact 21 and the second fixed contact 22. When the magnetic coil is powered off, there is no electromagnetic force between the second iron core 84 and the first iron core 81. Under the action of an elastic force of the reset spring 83, the first iron core 81 is pushed to downward move along the vertically downward arrow shown in FIG. 4, and finally returns to an initial position. Simultaneously, the drive rod 82 drives the insulation rod 50 to pull the first moving contact 61 and the second moving contact 62 to be respectively separated from the first fixed contact 21 and the second fixed contact 22.

Still referring to FIG. 3, when the reset spring 83 is disposed, a groove for accommodating the reset spring 83 is disposed on the iron core. One end of the reset spring 83 is abutted against the bottom of the groove, and the reset spring 83 partially extends from the groove. When the reset spring 83 is compressed, a sidewall of the groove plays a limiting role, to ensure that the reset spring 83 can be compressed in a vertical direction. In addition, the groove also accommodates the compressed reset spring 83, to ensure that the first iron core 81 can be in contact with the core.

FIG. 3 shows only a manner of driving the first moving contact 61 and the second moving contact 62. The drive mechanism and the pressing component 70 of the direct current contactor provided in an embodiment of the application are not limited to the manner shown in FIG. 3. FIG. 4 shows an assembling manner of another pressing component 70. In a structure shown in FIG. 4, a drive mechanism includes an insulation rod 50 and a drive component 80. The insulation rod 50 includes only a support rod 52, and the support rod 52 is separately connected to the first moving contact 61 and the second moving contact 62 through fastening. The support rod 52 is slidably connected to the drive component 80, and the drive component 80 is configured to drive the insulation rod 50 to drive the first moving contact 61 and the second moving contact 62 to synchronously move toward the first fixed contact 21 and the second fixed contact 22.

As shown in FIG. 4, the drive component 80 includes a drive rod 82 slidably connected to the first housing, the drive rod 82 is slidably connected to the support rod 52, and the support rod 52 and the drive rod 82 form a T-shaped structure. As shown in FIG. 4, the drive rod 82 is disposed in the second housing, extends into the first housing by penetrating through the sidewall between the second housing and the first housing, and an end that is of the drive rod 82 and that extends into the first housing is slidably connected to the support rod 52. Still referring to FIG. 4, a second elastic member is sleeved onto the drive rod 82. One end of the second elastic member is abutted against the support rod 52, and the other end of the second elastic member is abutted against the drive rod 82. The second elastic member is the foregoing pressing component 70. As shown in FIG. 4, a shoulder is disposed on the drive rod 82, and one end of the second elastic member is abutted against the shoulder. When the drive rod 82 drives the first moving contact 61 and the second moving contact 62, the drive rod 82 pushes the support rod 52 to upward move in a direction shown by a vertically upward arrow shown in FIG. 4, to drive the first moving contact 61 and the second moving contact 62 to move toward the first fixed contact 21 and the second fixed contact 22. When the support rod 52 is driven, the drive rod 82 first slides relative to the support rod 52, the second elastic member is compressed, and the support rod 52 is driven, by using an elastic force of the second elastic member, to upward move. After the first moving contact 61 is in contact with the first fixed contact 21 and the second moving contact 62 is in contact with the second fixed contact 22, the drive rod 82 continues to upward move, and in this case, the second elastic member continues to be compressed and generates a force for pushing the first moving contact 61 against the first fixed contact 21 and pushing the second moving contact 62 against the second fixed contact 22, to ensure reliable contact between the first moving contact 61 and the first fixed contact 21 and reliable contact between the second moving contact 62 and the second fixed contact 22.

Still referring to FIG. 4, the drive component 80 further includes a drive member. The drive member is configured to drive the drive rod 82 to slide. As shown in FIG. 4, the drive member includes two oppositely disposed iron cores. For ease of description, the two iron cores are separately named a first iron core 81 and a second iron core 84. The first iron core 81 is fastened onto the drive rod 82, the second iron core 84 is fastened into the housing, and there is a gap between the first iron core 81 and the second iron core 84. As shown in FIG. 4, the first iron core 81 is fastened to an end that is of the drive rod 82 and that is far away from the first housing, and the second iron core 84 is fastened to an end that is in the second housing and that is close to the first housing. In addition, a through hole that allows to be penetrated through by the drive rod 82 is disposed in the second iron core 84, and during assembling, the drive rod 82 is inserted into the first housing after penetrating through the through hole of the second iron core 84. As shown in FIG. 4, there is the gap between the first iron core 81 and the second iron core 84, and a reset spring 83 is disposed at the gap. The reset spring 83 is sleeved onto the drive rod 82, and two ends of the reset spring 83 are respectively pressed against the first iron core 81 and the second iron core 84. Still referring to FIG. 4, the drive member further includes a magnetic coil that surrounds the first iron core 81 and the second iron core 84. In addition, when the magnetic coil is powered on, the second iron core 84 and the first iron core 81 attract each other. During use of the direct current contactor, when the magnetic coil is powered on, the second iron core 84 and the first iron core 81 attract each other. Because the second iron core 84 is fastened into the second housing, the first iron core 81 overcomes an elastic force of the reset spring 83 to slide toward the magnetic coil and simultaneously push the drive rod 82 to slide, and the drive rod 82 drives the insulation rod 50 to push the first moving contact 61 and the second moving contact 62 to move in the direction shown by the vertically upward arrow in FIG. 4. When the first iron core 81 is in contact with the second iron core 84, the first moving contact 61 and the second moving contact 62 are respectively pressed against the first fixed contact 21 and the second fixed contact 22. When the magnetic coil is powered off, there is no electromagnetic force between the second iron core 84 and the first iron core 81. Under the action of an elastic force of the reset spring 83, the first iron core 81 is pushed to downward move along a vertically downward arrow shown in FIG. 4, and finally returns to an initial position. Simultaneously, the drive rod 82 drives the insulation rod 50 to pull the first moving contact 61 and the second moving contact 62 to be respectively separated from the first fixed contact 21 and the second fixed contact 22.

It can be learned from the foregoing description that when the direct current contactor works, the first moving contact 61 and the second moving contact 62 can be driven, by using only one drive mechanism, to move. Compared with the conventional technology, this reduces drive power consumption of the coil by half; and only a single drive mechanism is needed to drive two contacts, thereby greatly reducing difficulty in implementing closing and opening synchronicity between two electrode contacts.

Figure 5:
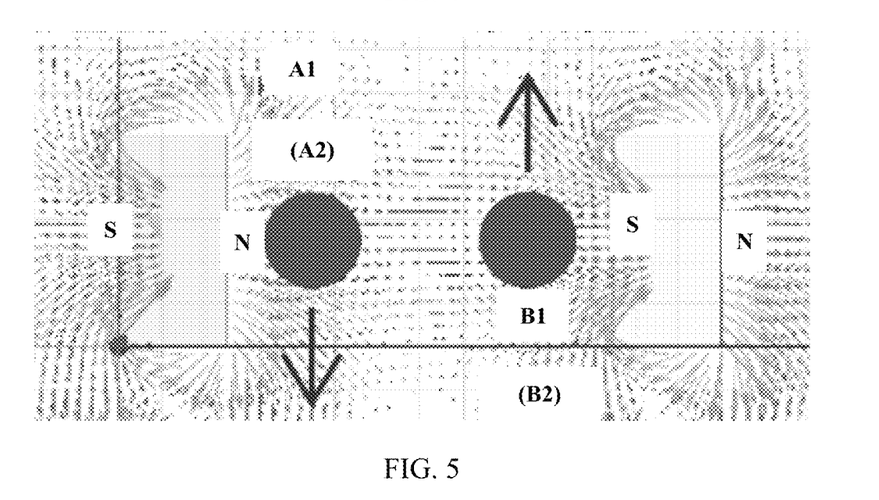
FIG. 5 is a schematic diagram of a direct current contactor during arc-extinguishing according to an embodiment of this application.

Referring to FIG. 4, when the first moving contact 61 and the second moving contact 62 move in a direction shown by the vertically downward arrow, the first moving contact 61 is separated from the first fixed contact 21, and the second moving contact 62 is separated from the second fixed contact 22. During separation, an electric arc is generated. Therefore, in the direct current contactor provided in an embodiment of the application, a first magnet 41 and a second magnet 42 are respectively disposed on two opposite sides of an outer sidewall of the first housing. The first magnet 41 is configured to extinguish an electric arc between the first fixed contact 21 and the first moving contact 61. The second magnet 42 is configured to extinguish an electric arc between the second fixed contact 22 and the second moving contact 62. When the first magnet 41 and the second magnet 42 are disposed, as shown in FIG. 3 and FIG. 4, a first magnetic pole of the first magnet 41 faces a gap between the first fixed contact 21 and the first moving contact 61, a second magnetic pole of the second magnet 42 faces a gap between the second fixed contact 22 and the second moving contact 62, and polarity of the first magnetic pole is opposite to polarity of the second magnetic pole. In FIG. 3 and FIG. 4, an N pole of the first magnet 41 faces the gap between the first moving contact 61 and the first fixed contact 21, and an S pole of the second magnet 42 faces the gap between the second moving contact 62 and the second fixed contact 22. FIG. 5 shows an electric arc direction during arc-extinguishing. FIG. 5 shows a magnetic field generated by the first magnet 41 and the second magnet 42, and the electric arc direction during arc-extinguishing. An electric arc generated between the first moving contact 61 and the first fixed contact 21 is downward, and an electric arc generated between the second moving contact 62 and the second fixed contact 22 is upward. Therefore, when the direct current contactor is open, there is no risk of short circuit caused because break arcs cross or are in contact with other electrodes. Therefore, the contact structure can simplify an embodiment of the double-connection arc-extinguishing chamber 10, so that non-polar arc-extinguishing can be implemented without making a ceramic isolation wall between the two electrode contacts, and only two arc-extinguishing permanent magnets are used.

Figure 6:
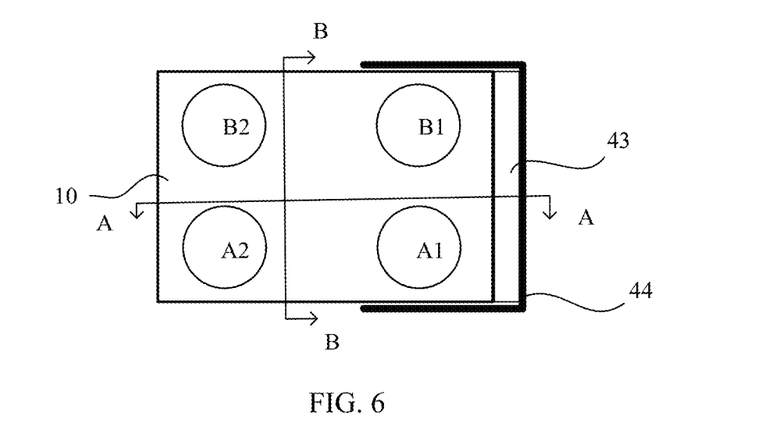
FIG. 6 is a schematic diagram of a structure of a third direct current contactor according to an embodiment of this application.
Figure 7:
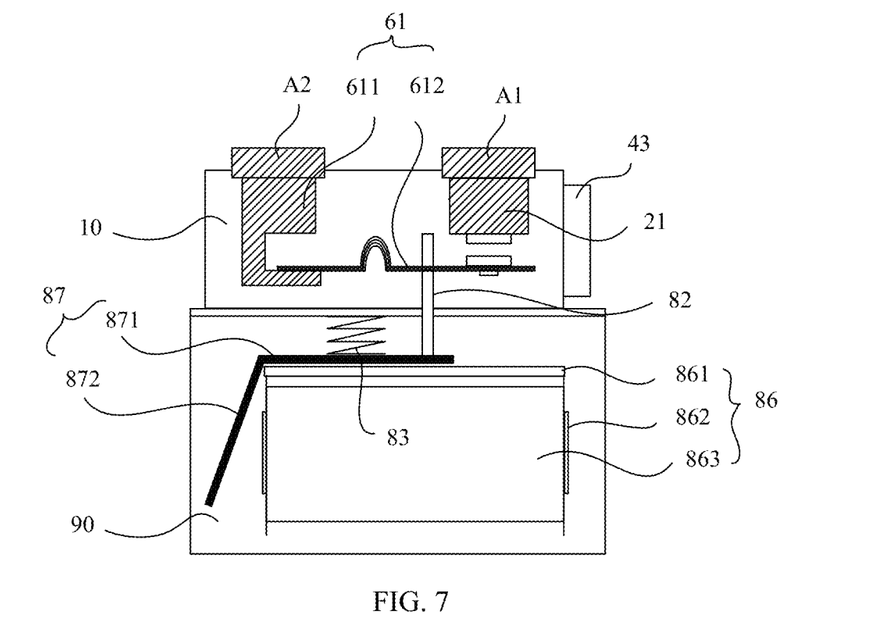
FIG. 7 is a cross-sectional view at A-A in FIG. 6.

FIG. 6 is a schematic diagram of a structure of another direct current contactor according to an embodiment of this application. FIG. 7 is a cross-sectional view at A-A in FIG. 6. For same reference signs in FIG. 6 and FIG. 7, refer to the descriptions in FIG. 3 and FIG. 4. Details are not described herein again. A main difference between the direct current contactor shown in FIG. 6 and the direct current contactor shown in FIG. 3 and FIG. 4 is a manner in which a moving contact is connected to a fixed contact. In FIG. 3 and FIG. 4, connection and separation between the moving contact and the fixed contact are implemented through sliding of the moving contact relative to the fixed contact. However, in the direct current contactor shown in FIG. 6, electrical connection to the fixed contact is implemented through rotating of the moving contact relative to the fixed contact. The following provides detailed descriptions with reference to accompanying drawings.

An arc-extinguishing chamber 10 and a drive chamber 90 in FIG. 6 and FIG. 7 are disposed in the same manner as the arc-extinguishing chamber 10 and the drive chamber 90 of the direct current contactor shown in FIG. 3 and FIG. 4. Therefore, details are not described herein again.

Still referring to FIG. 6 and FIG. 7, a first fixed contact 21, a second fixed contact 22, a first moving contact 61, and a second moving contact 62 that are provided in an embodiment of the application are disposed on a same surface of the arc-extinguishing chamber 10. The first fixed contact 21 and the second fixed contact 22 are disposed in the same manner as the first fixed contact 21 and the second fixed contact 22 in FIG. 3. Details are not described herein again.

Still referring to FIG. 6 and FIG. 7, the first moving contact 61 and the second moving contact 62 that are provided in an embodiment of the application are of a same structure. Therefore, the first moving contact 61 is used as an example to describe the structure. The first moving contact 61 provided in an embodiment of the application includes two parts: a first body 611 and a first elastic sheet 612. The first body 611 is fastened into the arc-extinguishing chamber 10, and the first body 611 is partially exposed from the arc-extinguishing chamber 10 after penetrating through a sidewall of the arc-extinguishing chamber 10, and a part that is of the first body 611 and that is exposed from the arc-extinguishing chamber 10 is used as a connecting bar and is configured to be connected to a high-voltage battery pack. A part that is of the first body 611 and that is located in the arc-extinguishing chamber 10 is connected to the first elastic sheet 612, and the first elastic sheet 612 is configured to be electrically connected to the first fixed contact 21. As shown in FIG. 7, a first end of the first elastic sheet 612 is fastened onto the first body 611, and the first elastic sheet 612 is electrically connected to the first body 611. The first elastic sheet 612 spans a gap between the first moving contact 61 and the first fixed contact 21, and a second end of the first elastic sheet 612 is located below the first fixed contact 21 (a placement direction of the direct current contactor in FIG. 7 is used as a reference direction). During use, the first elastic sheet 612 is elastically deformed, to enable the second end of the first elastic sheet 612 to be pressed against and electrically connected to the first fixed contact 21, so that the first moving contact 61 is electrically connected to the first fixed contact 21.

Still referring to FIG. 7, the first elastic sheet 612 provided in an embodiment of the application is prepared by using a metal sheet with relatively good elastic performance, for example, a common metal sheet with good elasticity and electrical conductivity such as a copper sheet or an aluminum sheet. In addition, in order that the first elastic sheet 612 has a good recovery force, when the first elastic sheet 612 is disposed, as shown in FIG. 7, an arc-shaped bend is disposed in a middle area of the first elastic sheet 612. In FIG. 7, although an opening of the arc-shaped bend is downward, the opening of the arc-shaped bend in an embodiment of the application may be alternatively upward. When the first elastic sheet 612 is elastically deformed, a deformed position is mainly in the bend structure. Certainly, in an embodiment of the application, a quantity of bend structures is also not limited, and a plurality of consecutive bend structures may be alternatively used. A quantity may be limited based on an actual requirement.

A structure of the second moving contact 62 is the same as the structure of the first moving contact 61. The second moving contact 62 is also divided into two parts: a second body 621 and a second elastic sheet 622 connected to the second body 621. A structure of the second moving contact 62 is the same as that of the first moving contact 61. Details are not described herein.

Figure 8:
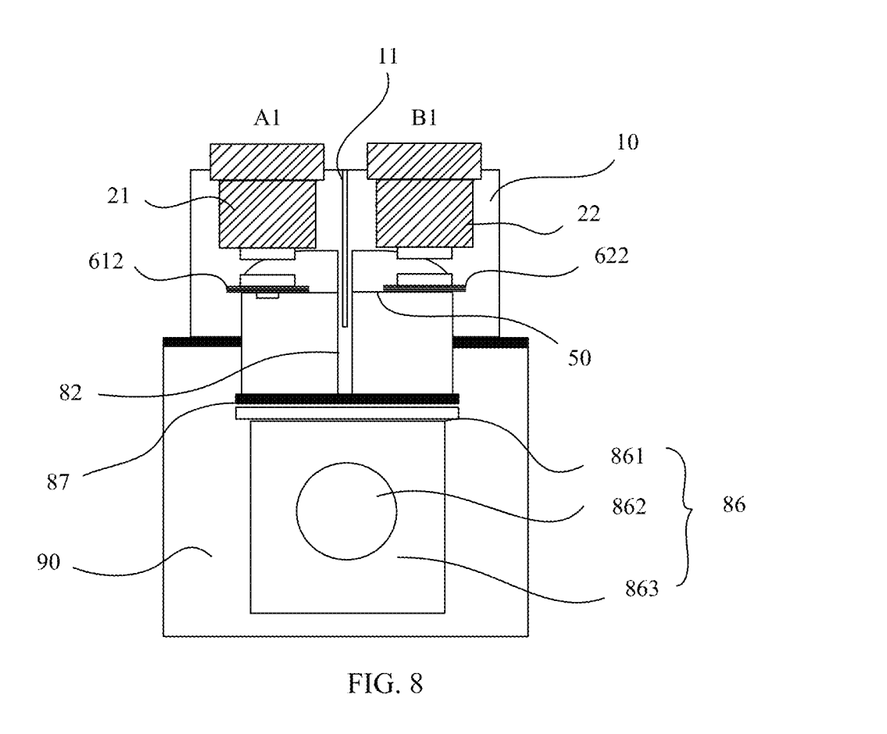
FIG. 8 is a cross-sectional view at B-B in FIG. 6.

FIG. 8 is a cross-sectional view at B-B in FIG. 6. When an insulation rod 50 is disposed, the insulation rod 50 is separately connected to the first elastic sheet 612 and the second elastic sheet 622 through fastening. In addition, the insulation rod 50 is connected to a drive component, to push the first elastic sheet 612 and the second elastic sheet 622 to synchronously move toward the first fixed contact 21 and the second fixed contact 22.

Still referring to FIG. 7 and FIG. 8, when a drive component 80 is disposed, the drive component 80 is configured to drive the insulation rod 50 to drive the first elastic sheet 612 and the second elastic sheet 622 to synchronously rotate toward the first fixed contact 21 and the second fixed contact 22. The drive component 80 includes a drive rod 82 connected to the insulation rod 50 through fastening, and the drive rod 82 enters the drive chamber 90 by penetrating through the arc-extinguishing chamber 10. In addition, the drive component 80 further includes an armature 87 and an electromagnet 86 configured to drive the armature 87 to rotate.

As shown in FIG. 7, the electromagnet 86 includes an iron core 862 disposed in the drive chamber 90, and a coil 863 wound around the iron core 862. The iron core 862 is horizontally disposed in the drive chamber 90, that is, a length direction of the iron core 862 is perpendicular to a stacking direction of the drive chamber 90 and the arc-extinguishing chamber 10. In addition, the electromagnet 86 further includes a yoke 861 disposed on the coil 863, and the yoke 861 is fastened onto a side that is of the coil 863 and that faces the arc-extinguishing chamber 10 and is configured to carry the armature 87. Still referring to FIG. 7, the armature 87 is of a V-shaped structure. The armature 87 includes a first part 871 and a second part 872 connected to the first part 871, and an angle between the first part 871 and the second part 872 is greater than 90 degrees, for example, the angle is different angles between 90° and 180°, such as 120° and 150°. The first part 871 laps on the yoke 861 and is stacked with the yoke 861. During connection to the drive rod 82, the drive rod 82 is connected to the first part 871 through fastening. In addition, a reset spring 83 is disposed between a sidewall of the drive chamber 90 and the first part 871, and the reset spring 83 is configured to push the first part 871 against the yoke 861. During disposition, two ends of the reset spring 83 are respectively pressed against the sidewall of the drive chamber 90 and the first part 871. It should be understood that the reset spring 83 shown in FIG. 7 is merely an example. The reset spring provided in an embodiment of the application is not limited to the structure shown in FIG. 7, provided that the reset spring can push the first part 871 against the yoke 861.

Still referring to FIG. 7, a connection position between the first part 871 and the second part 872 laps on an edge of the yoke 861, and the second part 872 is bent downward and faces the iron core 862 of the electromagnet 86. When the electromagnet 86 is powered on, the electromagnet 86 attracts the second part 872, and the armature 87 rotates around the edge of the yoke 861 and pushes the drive rod 82 to rotate, to push the first elastic sheet 612 and the second elastic sheet 622 to be respectively electrically connected to the first fixed contact 21 and the second fixed contact 22. Simultaneously, when the armature 87 rotates, the reset spring 83 is compressed. In addition, because the first elastic sheet 612 and the second elastic sheet 622 can be differently deformed, an assembling error can be overcome, to ensure that the first elastic sheet 612 and the second elastic sheet 622 are respectively reliably connected to the first fixed contact 21 and the second fixed contact 22. In this case, the first elastic sheet 612 and the second elastic sheet 622 are used as pressing components to provide a contact force for pressing against the first fixed contact 21 and the second fixed contact 22. When the electromagnet 86 is powered off, the armature 87 is recovered to an initial position by being pushed by the reset spring 83. Simultaneously, the first elastic sheet 612 and the second elastic sheet 622 are respectively disconnected from the first fixed contact 21 and the second fixed contact 22 by being driven by the drive rod 82.

Still referring to FIG. 6 and FIG. 8, when the first elastic sheet 612 and the second elastic sheet 622 are disconnected, an electric arc is generated. Therefore, an isolating board 11 is disposed in the arc-extinguishing chamber 10 in the direct current contactor provided in an embodiment of the application, to isolate the first moving contact 61 and the first fixed contact 21 from the second moving contact 62 and the second fixed contact 22, to avoid arc crosstalk. In addition, a third magnet 43 is further disposed outside the housing. As shown in FIG. 6, the third magnet 43 is disposed on a sidewall of the arc-extinguishing chamber 10, and the third magnet 43 is disposed on a sidewall connected to the isolating board 11. In addition, the electromagnet 86 is connected to a U-shaped magnetic conductive member 44, and two opposite sidewalls of the U-shaped magnetic conductive member 44 are respectively configured to extinguish an electric arc between the first fixed contact 21 and the first elastic sheet 612 and an electric arc between the second fixed contact 22 and the second elastic sheet 622. As shown in FIG. 6, in the two opposite sidewalls of the magnetic conductive member 44, one sidewall faces a gap between the first elastic sheet 612 and the first fixed contact 21, and the other sidewall faces a gap between the second elastic sheet 622 and the second fixed contact 22. Arc-extinguishing can be quickly performed by using a magnetic field generated by the magnetic conductive member 44, thereby improving security of the direct current contactor.

In addition, an embodiment of this application further provides a vehicle. The vehicle includes a body, a power distribution unit disposed on the body, and the direct current contactor according to any one of the foregoing embodiments that is connected to the power distribution unit. In this application, only two pairs of contacts are used to implement connection/disconnection of two electrode lines, so that a total contactor resistance is reduced by half compared with that in the conventional technology, thereby resolving a problem of a large on-state current loss in the conventional technology. In addition, drive power consumption of the coil 863 is reduced by half; and only a single drive mechanism is needed to drive two contacts, thereby greatly reducing difficulty in implementing closing and opening synchronicity between two electrode contacts.

The foregoing descriptions are merely embodiments of the application, but are not intended to limit the protection scope of this application. Any variation or replacement readily figured out by one of ordinary skilled in the art within the technical scope disconnected in this application shall fall within the protection scope of this application. Therefore, the protection scope of this application shall be subject to the protection scope of the claims.

What is claimed is:
1. A direct current contactor, comprising:
   a housing, comprising:
      a first fixed contact and a second fixed contact fastened into the housing and separately partially extend from the housing; and a first moving contact and a second moving contact located in the housing respectively corresponding to the first fixed contact and the second fixed contact;
a drive mechanism, comprising:
an insulation rod connected to the first moving contact and the second moving contact;
a drive component that drives the insulation rod to drive the first moving contact and the second moving contact to synchronously move toward the first fixed contact and the second fixed contact; and
a pressing component configured to push the first moving contact and the second moving contact against the first fixed contact and the second fixed contact respectively; and
a first connecting bar and a second connecting bar disposed outside the housing, wherein the first connecting bar is electrically connected to the first moving contact by using a first flexible cable, and wherein the second connecting bar is electrically connected to the second moving contact by using a second flexible cable.

2. The direct current contactor according to claim 1, wherein the first moving contact and the second moving contact can separately slide relative to the housing, and wherein the drive component is configured to push the insulation rod to drive the first fixed contact and the second fixed contact to slide.

3. The direct current contactor according to claim 2, wherein the insulation rod comprises a support rod and a first connecting rod and a second connecting rod disposed on the support rod through fastening, and wherein the first moving contact and the second moving contact are slidably assembled onto the first connecting rod and the second connecting rod respectively;
wherein the pressing component comprises:
a first elastic member sleeved onto the first connecting rod, wherein two ends of the first elastic member are respectively pressed against the support rod and the first moving contact; and
a second elastic member sleeved onto the second connecting rod, wherein two ends of the second elastic member are respectively pressed against the support rod and the second moving contact.

4. The direct current contactor according to claim 3, wherein the drive component comprises:
a drive rod slidably connected to the housing, wherein the drive rod is connected to the support rod through fastening; and
a drive member configured to drive the drive rod to slide.

5. The direct current contactor according to claim 4, wherein the drive member comprises:
a first iron core connected to the drive rod through fastening;
a second iron core sleeved onto the drive rod that can slide relative to the drive rod, wherein there is a gap between the first iron core and the second iron core;
a magnetic coil that surrounds the first iron core and the second iron core, wherein when the magnetic coil is powered on, the second iron core and the first iron core attract each other; and
a reset spring that is sleeved onto the drive rod and whose two ends are respectively pressed against the first iron core and the second iron core.

6. The direct current contactor according to claim 2, wherein the insulation rod comprises a support rod, and wherein the first moving contact and the second moving contact are separately connected to the support rod through fastening;
wherein the support rod is slidably connected to the drive component; and
wherein the pressing component comprises a second elastic member, wherein one end of the second elastic member is abutted against the support rod, and the other end is abutted against the drive component.

7. The direct current contactor according to claim 6, wherein the drive component comprises a drive rod slidably connected to the housing, wherein the drive rod is slidably connected to the support rod, wherein the second elastic member is sleeved onto the drive rod, wherein one end of the second elastic member is in pressure contact with the support rod, and wherein the other end of the second elastic member is in pressure contact with the drive rod.

8. The direct current contactor according to claim 1, further comprising:
a first magnet and a second magnet disposed on two opposite sides of an outer sidewall of the housing, wherein the first magnet is configured to extinguish an electric arc between the first fixed contact and the first moving contact, and wherein the second magnet is configured to extinguish an electric arc between the second fixed contact and the second moving contact.

9. The direct current contactor according to claim 8, wherein a first magnetic pole of the first magnet faces a gap between the first fixed contact and the first moving contact, wherein a second magnetic pole of the second magnet faces a gap between the second fixed contact and the second moving contact, and wherein polarity of the first magnetic pole is opposite to polarity of the second magnetic pole.

10. The direct current contactor according to claim 1, wherein the first moving contact comprises a first body and a first elastic sheet connected to the first body, and the second moving contact comprises a second body and a second elastic sheet connected to the second body; wherein
the insulation rod is separately connected to the first elastic sheet and the second elastic sheet through fastening; and wherein
the drive component is configured to drive the insulation rod to drive the first elastic sheet and the second elastic sheet to synchronously rotate toward the first fixed contact and the second fixed contact.

11. The direct current contactor according to claim 10, wherein the drive component comprises:
a drive rod connected to the insulation rod through fastening,
an armature connected to the drive rod, and
an electromagnet that drives the armature to rotate.

12. The direct current contactor according to claim 11, wherein the armature is a V-shaped armature comprising: a first part and a second part connected to the first part, wherein an angle between the first part and the second part is greater than 90 degrees, and wherein the drive rod is connected to the first part through fastening; wherein
the electromagnet comprises an iron core, a coil wound around the iron core, and a yoke fastened to the coil, wherein the yoke faces the insulation rod; wherein
a connection position between the first part and the second part laps on an edge of the yoke, wherein the first part is stacked with the yoke, and wherein the second part faces the iron core; and wherein
a reset spring is configured to push the first part against the yoke.

13. The direct current contactor according to claim 10, further comprising:
a third magnet disposed outside the housing and a U-shaped magnetic conductive member connected to the third magnet, wherein two opposite sidewalls of the U-shaped magnetic conductive member are respectively configured to extinguish an electric arc between the first fixed contact and the first elastic sheet and an electric arc between the second fixed contact and the second elastic sheet.

14. A vehicle, comprising:

a body, a power distribution unit disposed on the body, and a direct current contactor connected to the power distribution unit, wherein the direct current contactor comprises:

a housing, comprising:
 a first fixed contact and a second fixed contact fastened into the housing separately partially extend from the housing; and
 a first moving contact and a second moving contact located in the housing respectively corresponding to the first fixed contact and the second fixed contact;

a drive mechanism, comprising:
 an insulation rod connected to the first moving contact and the second moving contact;
 a drive component that drives the insulation rod to drive the first moving contact and the second moving contact to synchronously move toward the first fixed contact and the second fixed contact; and
 a pressing component configured to push the first moving contact and the second moving contact against the first fixed contact and the second fixed contact respectively; and a first connecting bar and a second connecting bar disposed outside the housing, wherein the first connecting bar is electrically connected to the first moving contact by using a first flexible cable, and wherein the second connecting bar is electrically connected to the second moving contact by using a second flexible cable.

15. The vehicle according to claim 14, wherein the first moving contact and the second moving contact can separately slide relative to the housing, and wherein the drive component is configured to push the insulation rod to drive the first fixed contact and the second fixed contact to slide.

16. The vehicle according to claim 15, wherein the insulation rod comprises a support rod and a first connecting rod and a second connecting rod disposed on the support rod through fastening, and wherein the first moving contact and the second moving contact are slidably assembled onto the first connecting rod and the second connecting rod in a one-to-one correspondence; wherein the pressing component comprises:
 a first elastic member sleeved onto the first connecting rod, wherein two ends of the first elastic member are respectively pressed against the support rod and the first moving contact; and
 a second elastic member sleeved onto the second connecting rod, wherein two ends of the second elastic member are respectively pressed against the support rod and the second moving contact.

17. The vehicle according to claim 16, wherein the drive component comprises:

a drive rod slidably connected to the housing, wherein the drive rod is connected to the support rod through fastening; and a drive member configured to drive the drive rod to slide.

* * * * *